US010250465B2

United States Patent
Baldi et al.

(10) Patent No.: US 10,250,465 B2
(45) Date of Patent: Apr. 2, 2019

(54) NETWORK TRAFFIC MONITORING AND CLASSIFICATION

(71) Applicant: Cisco Technology, Inc., San Jose, CA (US)

(72) Inventors: Mario Baldi, Brooklyn, NY (US); Han Hee Song, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 176 days.

(21) Appl. No.: 15/248,075

(22) Filed: Aug. 26, 2016

(65) Prior Publication Data

US 2018/0062950 A1   Mar. 1, 2018

(51) Int. Cl.
| | |
|---|---|
| *H04L 12/24* | (2006.01) |
| *H04L 12/26* | (2006.01) |
| *H04L 12/721* | (2013.01) |
| *H04L 29/08* | (2006.01) |

(52) U.S. Cl.
CPC ............ *H04L 43/026* (2013.01); *H04L 45/38* (2013.01); *H04L 67/02* (2013.01); *H04L 67/10* (2013.01)

(58) Field of Classification Search
CPC ....... H04L 43/026; H04L 45/38; H04L 67/10; H04L 67/02
See application file for complete search history.

(56) References Cited

U.S. PATENT DOCUMENTS

| | | | | |
|---|---|---|---|---|
| 2004/0073658 A1* | 4/2004 | Oran | ....................... | H04L 29/06 709/224 |
| 2009/0204696 A1* | 8/2009 | Zhang | ..................... | H04L 69/16 709/223 |
| 2012/0278464 A1* | 11/2012 | Lehane | ............... | H04L 12/1407 709/223 |
| 2013/0014253 A1* | 1/2013 | Neou | .................. | H04L 63/1441 726/22 |
| 2013/0276136 A1* | 10/2013 | Goodwin | ................ | H04L 67/22 726/27 |
| 2015/0124622 A1* | 5/2015 | Kovvali | ............ | H04W 28/0215 370/236 |

(Continued)

OTHER PUBLICATIONS

A. Tongaonkar et al., "Towards self adaptive network traffic classification", Computer Communications 56 (2015) 35-46, 12 pages.

(Continued)

*Primary Examiner* — Lan-Huong Truong
(74) *Attorney, Agent, or Firm* — Edell, Shapiro & Finnan, LLC

(57) ABSTRACT

Presented herein are network traffic/flow monitoring techniques for identifying a primary/core domain that is representative of the service being accessed by a series/set of network flows, and grouping networking traffic flows that result from the user's accessing of the core domain. In one example, a plurality of core domains each corresponding to a primary web service configured to be directly accessed by network flows via one or more networks is identified. For each of the plurality of core domains, one or more models of traffic activity resulting from access to the corresponding primary web service by a network flow is generated. Based on the models of traffic activity, real-time network traffic flows are associated to a selected one of the core domains.

20 Claims, 6 Drawing Sheets

(56) References Cited

U.S. PATENT DOCUMENTS

2015/0143456 A1* 5/2015 Raleigh ................ H04W 12/08
726/1
2017/0039144 A1* 2/2017 Wang .................... G06F 12/123

OTHER PUBLICATIONS

D. Plonka et al., "Flexible Traffic and Host Profiling via DNS Rendezvous", In Workshop SATIN, Apr. 2011, 8 pages.

P. Foremski et al., "DNS-Class: Immediate classification of IP flows using DNS", International Journal of Network Management, Int. J. Network Mgmt 0000; 00:1-16, vol. 24, Issue 4, Jul./Aug. 2014, 18 pages.

* cited by examiner

——— CORE DOMAIN C1 FLOW
—•— CORE DOMAIN C2 FLOW
- - - - C1 SUPPORT DOMAIN FLOW
—-— C2 SUPPORT DOMAIN FLOW
—✕—✕— BACKGROUND FLOWS
•••••• AMBIGUOUS DOMAIN FLOWS

NETWORK TRAFFIC MONITORING AND CLASSIFICATION

TECHNICAL FIELD

The present disclosure relates to network traffic monitoring and classification

BACKGROUND

A number of different types of services that generate flows to multiple servers are available in computer networks. For example, the Internet is a collection of interconnected computer networks that enable users to access various services, a notable example of which are web services forming the World Wide Web (the Web). In other words, web services (e.g., websites) are one type of the many services provided over the Internet. Other services provided over the Internet include, for example, cloud services, e-mail, chat, file transfer, etc.

In general, the Web is tangled with (i) multiple services co-located on the same platform, and (ii) several websites, services, applications, etc. all generating traffic or flows to support content delivery networks (CDNs), advertisements, and tracking platforms. Hyper Text Transfer Protocol (HTTP) and Hyper Text Transfer Protocol Secure (HTTPS) are the primary mechanisms employed to enable users to access web services via the Internet. For example, HTTP/HTTPS support a large and growing fraction of communications, independently of whether users are browsing the Web, accessing business or leisure applications, deploying mobile apps or desktop applications, sharing or accessing content, etc.

DESCRIPTION OF EXAMPLE EMBODIMENTS

Overview

Figure 1:
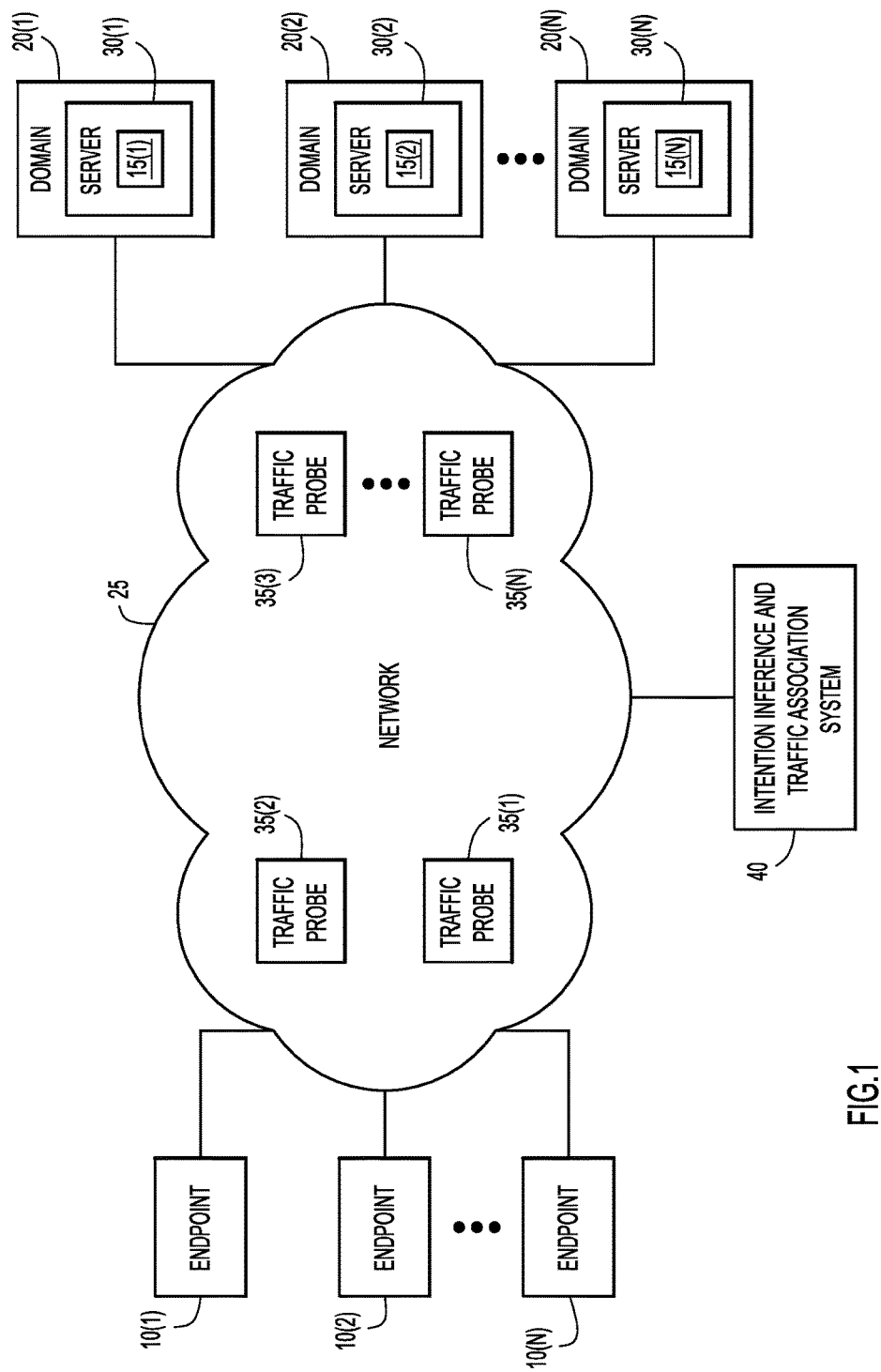
FIG. 1 is a block diagram illustrating an intention inference and traffic association system monitoring network traffic, according to an example embodiment.

Presented herein are network traffic/flow monitoring techniques for identifying a primary/core domain that is representative of the service being accessed by a series/set of network flows, and grouping networking traffic flows that result from the user's accessing of the core domain. In one example, a plurality of core domains each corresponding to a primary service configured to be directly accessed by network flows via one or more networks is identified. For each of the plurality of core domains, one or more models of traffic activity resulting from access to the corresponding primary service by a network flow is generated. Based on the models of traffic activity, real-time network traffic flows are associated to a selected one of the core domains. One or more network traffic management records for monitoring and policy enforcement within the one or more networks may then be generated. The one or more network traffic management records indicate the association of one or more real-time network traffic flows to a selected one of the core domains.

Example Embodiments

Monitoring how web services are used and how they consume network resources is important to Internet Service Providers (ISP) when planning and operating networks. Similarly, companies generally need to monitor their enterprise traffic to, for example, limit the consumption of bandwidth, to identify sudden growth in usage of services, to enforce corporate polices on allowed applications and services, etc. With increasing amounts of traffic generated by a corporation directed to web services offering "shadow IT" services (i.e., cloud or Software as a Service (SaaS) applications), network administrators currently lack tools to understand and control network usage.

Certain conventional traffic monitoring techniques enable a network administrator to observe the protocols and servers used by network traffic. However, as noted above, a large and growing fraction of information exchanges over the Internet are based on the HTTPS protocol. That is, whether users are browsing the Web, accessing business or leisure applications, using mobile or desktop applications, sharing or accessing content, etc., it is increasingly likely that HTTPS is used to support the communication. This trend towards "encryption by default" leaves in-network traffic monitors with mostly Layer-3 and Layer-4 information, eventually augmented with the name of the server as obtained via Domain Name System (DNS) or Transport Layer Security (TLS) handshake parsing. Unfortunately, even the identity of the server (e.g., the Internet Protocol (IP) address of the server) to which traffic is directed cannot be leveraged to associate traffic to specific user activities because, for example, (i) Content Delivery Networks (CDNs) and cloud computing platforms co-locate multiple services and applications and (ii) websites, services and mobile applications generate HTTPS flows to different servers as a result of dynamic content, advertisements, plugins, trackers, etc. That is, when a user accesses a particular service, one or more network flows are sent to the domain of that particular service. However, there may also be several flows sent of other going to other ancillary/support services within different domains. Although these support flows are sent to different domains, they are, in effect, related to the access of the primary service. Conventional techniques are unable to distinguish between flows sent to a primary service and those sent to support services and, accordingly, cannot determine which network traffic flows belong together.

Due to the above, traditional solutions for traffic classification and metering fall short in providing visibility into a user's activity, namely the "intent" of the user. As used herein, the intent of the user refers to determining the primary or target service (e.g., website, web service, cloud service, application, etc.) accessed when the user's endpoint/client device generates and sends a plurality of network flows (i.e., series of packets). Visibility into the intent of the user (i.e., the ability to determine the target service being accessed) is important to service providers and corporate network administrators alike and may be used to properly dimension their network, charge users, and possibly police traffic. As such, presented herein are network traffic/flow monitoring and classification techniques, sometimes referred to herein as intention inference and traffic association techniques or as a Web Helper Accounting Tool (WHAT). The techniques presented herein overcome the deficiencies of current network monitoring techniques by: (i) identifying a primary/core domain that is representative of the service being accessed by a series of network flows, and (ii) grouping networking traffic flows that result from the user's accessing of the core domain (i.e., identifying and grouping flows that belong to the same transaction, namely the user's access to the core domain). As described further below, the core domain is representative of the user's intent and the grouping of related network flows enables accurate accountability per service.

As noted, the intention inference and traffic association techniques presented operate to identify a service a user intends to visit, where the service can be a web site, a web service, a cloud service, the network-based component of a mobile application, etc. A network flow to the service a user intends to visit is referred to herein as a "core domain flow," and the domain of the server accessed by the core domain flow is referred to herein as the "core domain." The intention inference and traffic association techniques also operate to associate/group ancillary flows with (to) the core domain flow. The flows that are associated with the core domain flow are flows that are related to the user's visit to the core domain, i.e., flows that are triggered as a result of accessing of the primary service. The domains of the server(s) accessed by these other flows triggered by the user's visit to the core domain are referred to as "support domains," and the network flows to these support domains are referred to as "support domain flows." In general, the support domains are subordinate to a corresponding core domain as a result of some action at the core domain, such as downloading pictures, plugins, videos, advertisements, etc. that trigger traffic to the corresponding hosts (e.g., servers of CDNs, clouds, etc.). In other words, the intention inference and traffic association techniques are able to determine the primary service a user intends to visit (i.e., determine what service is the primary target of a series of network flows generated by an endpoint) and to determine the network flows that are associated with that visit to the primary service.

FIG. 1 is a block diagram of an arrangement in which the intention inference and traffic association techniques presented herein may be implemented. Shown in FIG. 1 are a plurality of endpoints (e.g., client devices) 10(1)-10(N) that may be used by a user (not shown) to access services 15(1)-15(N) in one or more domains 20(1)-20(N) via at least one network 25. The network 25 may be formed by one or more Local Area Networks (LANs), Wide Area Networks (WANs), such as the Internet, etc. FIG. 1 also illustrates each domain 20(1)-20(N) comprising a single server 30(1)-30(N) each hosting a corresponding service 15(1)-15(N). It is to be appreciated that the presence of one server in each domain, as well as the one-to-one correspondence of services to domains and servers is merely for ease of illustration and discussion. In practice, domains may include multiple servers and/or services.

The endpoints 10(1)-10(N) may comprise any of a number of different types of computing devices that allow a user to access the World Wide Web (the Web) via the network 25. For example, the endpoints 10(1)-10(N) may comprise computers (e.g., laptop of desktops, thin client devices, etc.), mobile devices (e.g., tablet computers, mobile phones, etc.), or other devices with network connectivity.

Also shown in FIG. 1 is a plurality of traffic meters or probes 35(1)-35(N). The traffic probes 35(1)-35(N) are passive network measurement devices that are configured to monitor network traffic (i.e., network flows each formed by a series of network packets) generated by the endpoints 10(1)-10(N) when accessing one or more of the services 15(1)-15(N). The traffic probes 35(1)-35(N) are configured to generate flow records that include information about the network flows and send the flow records to a traffic analysis system 40, sometimes referred to herein as an intention inference and traffic association system. The probe devices 35(1)-35(N), as well as the flow records sent by the probe devices to the intention inference and traffic association system 40, many have a number of different forms. However, in general, the flow records include per-flow information (i.e., information representative of each of a series of network flows sent by an endpoint). Beside traditional information such as flow identifier, client identifier, volume, timestamp etc., the per-flow information also includes the domain name of the server to which the flow is directed (i.e., the domain name of the server being contacted by the flow).

The intention inference and traffic association system 40 is configured to implement the intention inference and traffic association techniques to determine the service a user intends to visit (i.e., identify a core domain for a set of network flows) and to determine which network flows are associated with that visit (i.e., identifying the support domains that are subordinate to each core domain and having associated flows that are the result of ancillary operations, such as downloading pictures, plugins, videos, advertisements, etc.). In general, the intention inference and traffic association techniques may be viewed as comprised of three processes, namely: (1) the automatic identification of core domains, based on a machine learning classifier; (2) Bag of Domains (BoDs) creation, and (3) classification of traffic flows to a specific BoD, as core or support domains. Each of these processes is described further below. In one example, the output of the intention inference and traffic association techniques is a set of network flow information for a set of flows, referred to herein as a network traffic management record, where each flow is annotated to indicate the core domain of the BoD to which the flow is associated. This information is useable for traffic monitoring and policy enforcement within the network 25. In one example, the network traffic management record may be displayed to a user and/or analytics can then be run to present statistics on the corresponding traffic. The information is also usable to promote higher security of the network 25. For example, the data conveyed in the network may include personal or corporate information. Upon monitoring, traffic with the sensitive data can be blocked from leaking into the Internet or provide to a private service such that the data is consumed within the network 25. In another deployment, the network traffic management record can be leveraged to implement access policies, i.e., to determine which flows should be blocked because all activity related to a certain core domain should be denied. Typical applications of this are parental control (in residential network scenarios) and corporate policy enforcement (in corporate network scenarios).

In certain examples, the network traffic management record can include a list of BoDs with which network flows can be associated, for example as a core domain flow or a support domain flow. When displayed at a display screen, such a list of BoDs can enable an operator/user to make the final decision regarding which BoD a flow or set of flows should be associated. In other words, the system may provide a user with options regarding which domains a flow or set of flows could be associated with, and the user decides which "label," from among the presented options, should be assigned to the flow.

The intention inference and traffic association system 40 operates as a supervised system that first builds models based on labeled/archived data traces, and then uses the models to classify live traffic (i.e., perform real-time network flow classification). In general, the models are defined in a substantially automated manner, minimizing user intervention and with the ability to naturally adapt to usage scenarios. As noted, flow records exported by the passive network measurement devices (e.g., the traffic probes 35(1)-35(N)) are the information used for the flow classification.

Figure 2A:
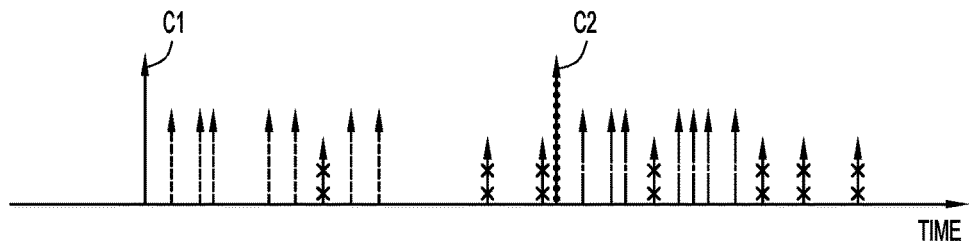
FIGS. 2A-2C are plots illustrating a sequence of flows generated by an endpoint, according to an example embodiment.
Figure 2B:
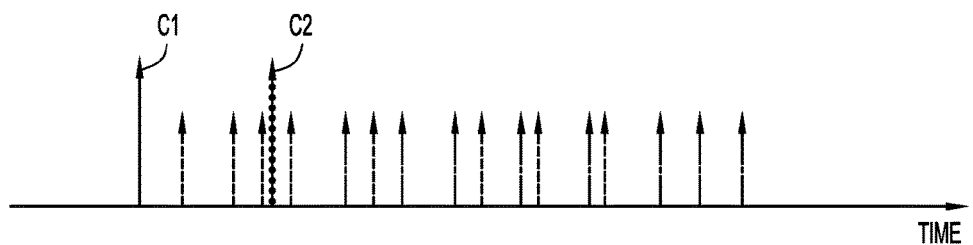
Figure 2C:
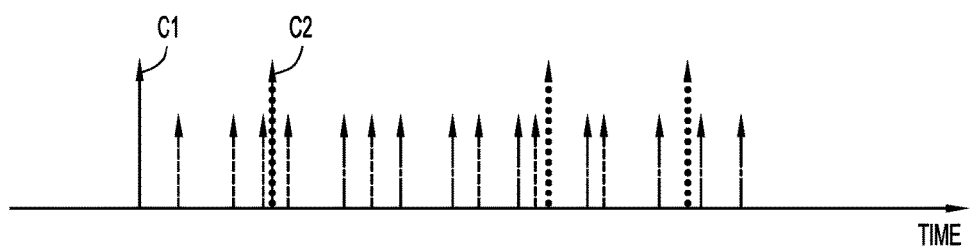

Before describing further details of the automatic identification of core domains, BoD creation, and classification of traffic flows to a specific BoD, reference is first made to FIGS. 2A, 2B, and 2C, which are plots that schematically illustrate example network flows and how those flows may be analyzed in accordance with the examples presented herein. In the examples of FIGS. 2A-2C, a user browsing the Web visits two services, referred to as web service C1 and web service C2.

As shown, the user's web browser opens dozens of connections (e.g., Transmission Control Protocol (TCP) connections) that issue HTTP/HTTPS requests to tens of servers in different domains to retrieve elements of webpages, such as images, Cascading Style Sheet (CSS) files, third-party objects, scripts, etc., that, once run, may generate even more requests. Each of these connections is represented by one of the arrows in FIGS. 2A-2C, and is referred to as a "domain." As used herein, the terms "domain" or "domain name" refer to a Fully Qualified Domain Name (FQDN). As noted above, the target domain of a user's traffic is referred to herein as a core domain, while domains that are automatically accessed in by the core domains are referred to as support domains.

FIGS. 2A-2C each show a sequence of flows generated, over time, by the user visiting web services C1 and C2. The plots of FIGS. 2A-2C each consists of a time-line with arrows marking the instant of time flows to a server are started. As noted, certain arrows represent flows to the core domains C1 and C2, while other arrows represent the flows to support domains that are triggered by accessing one of the core domains. Also shown are miscellaneous or background flows that are unrelated to the access of the core domains (i.e., traffic flows which are not linked to the actual web services the user intends to access). These miscellaneous or background are referred to herein as "non-relevant flows."

As noted, the techniques presented herein are configured to identify the primary service (i.e., the core domain) that is accessed by a set of network flows and associate network flows (traffic) with the set that are triggered by the primary service there with. In other words, the techniques presented herein are configured to account for substantially all traffic generated by a user when visiting a primary service. For this, the techniques presented herein create and make use of models of the traffic (network flow) activity resulting from accessing a web service (e.g., cloud service, website, mobile application, etc.). These models, which are referred to herein as Bag of Domains (BoDs), are described further below.

Returning to the examples of FIGS. 2A-2C, FIG. 2A depicts a scenario in which a user contacts the two web services C1 and C2 at two different moments in time, while some applications are generating background network flows. Flows to each core domain C1 and C2 occur first, followed by flows to support domains. In the example of FIG. 2A, there is no ambiguity among BoDs, and domains associated with background traffic. In this example, each domain identified in the network belongs to exactly one BoD, while background domains are not part of any BoDs. In such examples, the techniques presented herein annotate each flow having a domain in the BoD of the core domain closest in time.

FIG. 2B illustrates an alternative scenario where parallel navigation to the two web services C1 and C2 takes place. For instance, the user may use multiple browsers or tabs at an endpoint to navigate through pages at the same time, or multiple devices may share the same connection (e.g., via NAT). In these cases, flow identifier information may not allow for the identification of which user/endpoint/application/tab (i.e., client) is generating the traffic. However, even if the BoDs of web services C1 and C2 have no common domain, the techniques presented herein can correctly associate support flows to C1 and C2 by determining the BoD with which the flows belong.

FIG. 2C depicts another scenario where flows with ambiguous domain names appear in the trace. Flows to ambiguous domains may arise in different examples and may be solved via heuristics. In one such example, an ambiguous domain is a support domain, but it appears in several BoDs. In certain cases, the techniques presented herein assume that the closest core domain, in time, is the core domain with which the ambiguous domain should be associated (i.e., C2 in the example of FIG. 2C). In another example, an ambiguous domain is both a support domain and a core domain. For instance, the domain "example.com" could be accessed directly by the user (as a core domain), or as a third-party service (e.g., a web-site embedding an "example.com" plugin). To disambiguate these cases, the techniques presented herein examine flows coming before and after the ambiguous entry. The techniques then calculate the chance (probability) for that flow to be a core domain that triggers a new independent navigation, or rather to be a support domain for the previous core domain. In other examples, an ambiguous domain is a domain that is used by background and core services. As before, the techniques presented herein compute a score to consider whether it is a support or background domain.

Figure 3:
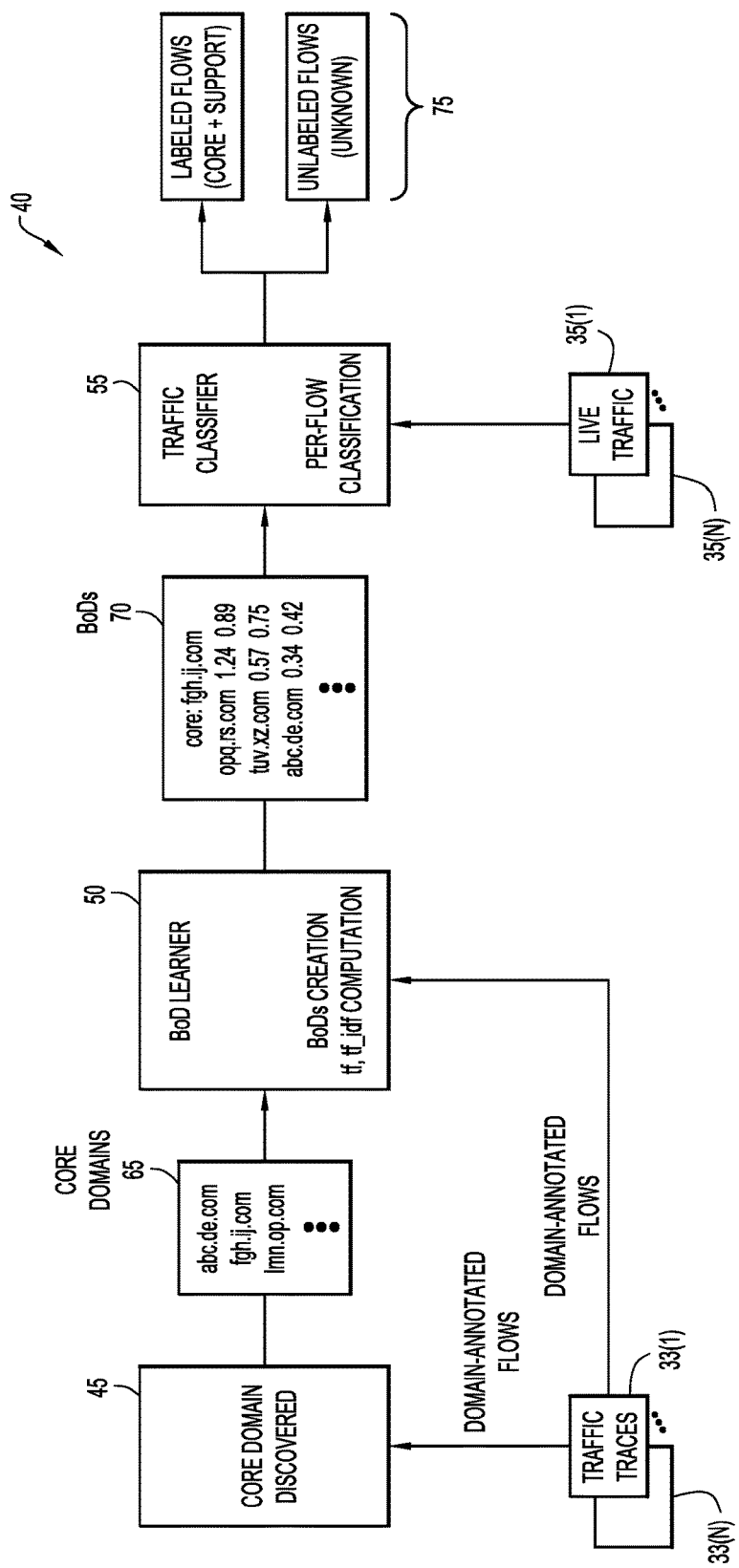
FIG. 3 is a schematic diagram illustrating an intention inference and traffic association system, according to an example embodiment.

FIG. 3 is a schematic diagram illustrating functional modules of an intention inference and traffic association system, such as system 40 of FIG. 1, in accordance with the examples presented herein. As shown, the intention inference and traffic association system 40 comprise three functional modules, referred to as the core domains discoverer 45, the BoD learner 50, and the traffic classifier 55. The core domains discoverer 45 and the BoD learner 50 may, in certain examples, use archived traffic traces to train the system models, whereas the traffic classifier 55 is deployed in the network to classify new flows from live networks (i.e., classify flows in real-time).

Before describing each of the core domains discoverer 45, the BoD learner 50, and the traffic classifier 55, the expected input data format is first described below. More specifically, as noted above, the intention inference and traffic association system 40 is configured to receive flow records representing network flows, where a network flow f (e.g., client and server IP addresses, ports and transport protocol) has a start timestamp (tsf) and an end timestamp (tef) (i.e., the time of the first and last packets in the network flow, respectively). For ease of illustration, it is assumed that the flow record is enriched with information about the server FQDNs (df) used by clients when obtaining the server IP address. Flow meters/probes typically export information from the network and transport layers, missing the association between server IP addresses and FQDNs. Different methods can be used to annotate flow records with FQDNs. For example, DNS logs can be employed to extract queries/responses and annotate records in a post-processing phase. Alternatively, some flow meters export such information on-the-fly directly from the measurement point for popular protocols. For instance, Deep Packet Inspection allows one to extract Server Name Identification (SNI) from encrypted TLS flows, or server Host, i.e., from plain HTTP flows.

Shown in FIG. 3 are traffic probes 33(1)-33(N) and 35(1)-35(N) that collect data summarizing flows. The traffic probes 33(1)-33(N) and 35(1)-35(N) are configured to expose various metrics, including server IP addresses contacted by clients, timestamps of the first packet in each flow and bytes counters per flow. The traffic probes 33(1)-33(N) and 35(1)-35(N) also implement a mechanism that exposes FQDNs clients resolve via DNS queries prior to open flows. As shown, the traffic probes 33(1)-33(N) make use of archived traffic traces to train the system, whereas the traffic probes 35(1)-35(N) make use of live (real-time) traffic.

Reference is now made to the core domains discoverer 45. In particular, the first task for training the intention inference and traffic association system 40 is to identify core domains, i.e., those domains $C=\{c1, \ldots, ck\}$ that a user may directly access. As noted, core domains are distinguished from support domains, i.e., those domains $S=\{s1, \ldots, sj\}$ which an application generates to fetch all objects that are part of a service. In general, the core domains discoverer 45 operates to determine whether a given domain (d) is a core or support domain.

In certain examples, the core domains discoverer 45 classifies domains by making use of a decision tree classifier. The training of the decision tree may be performed using a labeled dataset, in which a list of core and support domains is given, and features are extracted to characterize each of the two types of domains, and feature differences between the two types of domains is determined. During training, the classifier builds an internal model (e.g., a decision tree) that can be used later to classify a domain based on the sole knowledge of features.

To create the decision tree, the set of features to use for classification is first defined. In one example, an extensive list guided by domain knowledge is selected and the classifier is permitted to choose which are those that better allow separation of core and support domains. For example, given a domain (d) for www.example.com, the system visits the main page at www.example.com by using an automated browser and features are then automatically extracted therefrom. Table 1, below, summarizes the list of features that may be extracted for a domain and that may be used as part of a decision for classifying domain as a core or support domain (i.e., to create feature differences), along with a brief description and the expected behavior. For instance, for core domains, it is expected that the length of the main HTML response will be long, and will include large number of objects, possibly hosted in different domains, with the overall page result sizable. It is also expected that the domain with start with 'WWW,' and eventually accept a redirect to the same domain, i.e., HTTP response code can be 2xx or 3xx, but not 4xx. It is also expected that the server to be a well-known solution, and serve a HTML page. Finally, core domain flows may be separated in time from previous flows due to user think time. In practice, however, it is expected that the separation between core and support domains may be blurred in time.

TABLE 1

| Feature | Core | Support |
| --- | --- | --- |
| HTML resp. length | long | short |
| Object number | large | small |
| Domains in page | large | small |
| page size | large | small |
| www. in d | likely | unlikely |
| Redirect to | same domain | other domain |
| HTTP resp. code | 2xx, 3xx | 1xx, 4xx, 5xx |
| Server | Apache, ISS | ngix, custom |
| Content-Type | text/html | application/xml, other |
| ΔT from previous | long | short |

Given the list of core and support domains, a labeled dataset is built that can be used for training and testing. In one example, the final decision tree results in a efficient and intuitive model, shown below as:

if (HTML resp. length <= 3375B) then Support
else
    if (redirect to == other) then Support
    else Core In certain self-configuration examples, during a bootstrapping phase the intention inference and traffic association system 40 automatically builds the list of popular domains from a given vantage point. The system then runs an active crawling phase to extract features and uses the classifier to select an initial set of core domains (C). An illustrative set of core domains generated by the core domains discoverer 45 are shown in FIG. 3 at reference number 65, but are referenced below as "C."

Referring next to the BoD learner 50, given the set of core domains C, the intention inference and traffic association system 40 learns the BoD ($B_c$) for each core domain (i.e., learns the $B_c$ for each $c \in C$). As noted above, a BoD is a model of the network flow activity resulting from accessing a web service (e.g., a list of possible support domains that may serve objects that are part of a core domain). Each core domain has at least one corresponding BoD. In one form, domains are processed by maintaining only stems, where numbers are replaced by a constant (e.g., 123-edge.example-.com becomes D-edge.example.com) and isolated characters are replaced by constants (e.g., example-a.cdn.net becomes example-C.cdn.net). An illustrative set of BoDs generated by the BoD learner 50 are shown in FIG. 3 at reference number 70. An individual BoD is referenced below as "$B_c$."

The BoD learner 50 considers the flow trace generated by each endpoint/client, e.g., all flows generated by the same client IP address. Intuitively, after an endpoint requests a web page, support domains are contacted, and the system see flows annotated with domains in the traces. Thus, the BoD can be learned by inspecting domain names of flows initiated immediately after a core domain flow. For this, active experiments can be used that include, for example, randomly visiting pages and then extracting domain names there from. While active experiments would generate a clean and reliable dataset, such experiments have limited (i) temporal and (ii) spatial scope. For instance, different pages may present different content, with possibly user authentication complicating the access to internal pages. Similarly, the browser, endpoint, or application being used may change the content being served.

As such, in certain examples the intention inference and traffic association system 40 directly extracts the BoD from the passive traces directly at the vantage point, i.e., learning (and updating) the BoDs from the data to which the system is exposed. Passive traces naturally factor in all the above issues. The intention inference and traffic association system 40 considers valid triggers as those flows directed to a core domain C that appears after an idle period ($\Delta T_{idle}$), i.e., likely due to a new user visit. When a trigger is observed, the intention inference and traffic association system 40 extracts all domains found in the time window (e.g., proceeding or following). This time window is referred to as the observation window (OW) and has a duration $\Delta T_{OW}$. A domain (d) appearing in the observation window becomes part of the BoD of C (i.e., part of $B_c$) as a support domain for C. Traces from each endpoint contribute to the learning of $B_c$.

There are two additional aspects to be taken into account when learning the BoDs. First, support domains may appear immediately after visits to core domains, but also quite separate in time (e.g., a page reload, or a video being displayed after an advertisement, etc.). The time period $\Delta T_{OW}$ that is searched by the system for support domains may be selected to account for these uses.

Second, not all support domains appear after every request to a core domain and background traffic, as well as support domains triggered by other core domains, may appear nearby C (e.g., by chance), thereby potentially affecting $B_c$ with false support domains. As such, the intention inference and traffic association system 40 operates by observing a large number of observation windows to accumulate support domains, and then identify/select those that are actual support domains for a given core domain C. Over time, actual support domains emerge, whereas the irrelevant ones (including background and false domains) can be filtered out by means of thresholds and domains scores.

In certain examples, the BoDs to be used for classification and/or the content of one or more BoDs can be automatically selected by the intention inference and traffic association system 40. However, in other examples, a list of possible BoDs, or a list of possible content for one or more BoDs, can be provided to a user for a final selection therefrom. In other words, the system may provide a user with options (e.g., by displaying possible BoDs at a display) regarding which BoDs should be used for classification of flows and/or which core or support domains should form part of a BoD, and the user selects from among the presented options. The option(s) selected by the user are then utilized by the system 40 for traffic classification/labeling.

An aspect of the examples presented herein is that domains that are triggered by a core domain should appear more frequently in observation windows than other domains (e.g., background domains, etc.). A text processing methodology is leveraged to implement a score-based filtering process to remove false support domains, including background domains and support domains associated with other core domains (i.e., non-relevant support domains). In particular, the term frequency (tf)-inverse document frequency (idf) of domains in the "bags" is used to represent scores. The tf-idf is used in information retrieval to evaluate the importance of a word to a document in a collection. A word is more important when it appears often in a document (captured by the tf), but the importance of the word is reduced by a factor representing how frequent the word appears in other documents in the collection (captured by the idf).

In the present case, a BoD ($B_c$) is the "document" for the core domain C, a "word" is a domain name $d \in D$, and the collection of documents is the set of all BoDs. Domains triggered by a single core domain should have high tf and high idf, domains that are triggered by many core domains (e.g., advertisements) should have high tf, but low idf, while domains related to background traffic should have low tf and low idf. This result is given below by Equations (1), (2) and (3) below as:

$$tf(d, B_c) = \frac{\sum_{W \in OW_c} |d \in W|}{|OW_c|} \quad (1)$$

$$idf(d, BoDs) = \log \frac{|BoDs|}{|B_c \in BoDs : d \in B_c|} \quad (2)$$

$$S(d, B_c) = tf(d, B_c) \times idf(d, BoDs) \quad (3)$$

where $tf(d, B_c)$ is the number of times a domain (d) appears in any observation window W for the core domain C, normalized by the number of observation windows. It is noted that $tf(d, B_c)$ can be greater than 1, since a support domain can appear multiple times in the same observation window. In addition, $idf(d, BoDs)$ is the logarithm of the ratio between the number of BoDs in the collection and the number of BoDs containing the domain (d). Thus, the more BoDs a domain appears in, the closer to zero $idf(d, BoDs)$ is, thereby resulting in a smaller $S(d, B_c)$.

The outcome of the training phase is the creation of BoDs for each core domain $c \in C$. Each domain $d \in B_c$ is associated with two scores, namely:

$$B_c = \{(d, tf(d, B_c), S(d, B_c)) | d \in D\}. \quad (4)$$

If a domain (d) appears in all BoDs, then $idf(d, BoDs)=0$ and $S(d,=0$, suggesting its presence is insignificant to characterize the document (i.e., the BoD). Similarly, if a domain (d) does not appear in any observation window $OW_c$, then $tf(d, B_c)=0$ and $S(d, B_c=0$. The intention inference and traffic association system 40 uses the $tf(d, B_c)$ score to filter out those domains which appear too in-frequently, i.e., $tf(d, B_c)$<MinFreq, since those are likely to be background or false support domains. The score $S(d, B_c)$ allows the system to assign ambiguous domains that appear into two BoDs (i.e., as shown in FIG. 1C) during classification.

Referring next to the traffic classifier 55, once core domains are identified, and their respective BoDs are built, the intention inference and traffic association system 40 processes active traces (i.e., time network flow information) to assign network flows to the most likely core domain.

That is, the traffic classifier 55 receives three inputs of (i) a set of flows $F=\{f_1, \ldots, f_n\}$ where f is a flow generated by a single endpoint/client via one of the traffic probes 35(1)-35(N) and n is the total number of flows, (ii) list of core domains $C=\{c_1, \ldots, c_k\}$ where c is a core domain and k is the number of core domains, and (iii) BoDs of core domains in C, BoDs=$\{Bc_1, \ldots, Bc_k\}$ where Bc is a BoD for core domain c.

Using the BoDs as fingerprints of the core domains, the traffic classifier 55 greedily discovers membership of the flows to each bag. In doing so, the traffic classifier 55 goes through each flow f in temporal order and determines whether f is one of the core domains c or not. If f is a core domain c, it further determines whether flows before and after f match with a BoD Bc. This requires detection of flows temporally local to f (detailed in Algorithm 1) and matching fingerprints of flows around f against BoDs (detailed in Algorithm 2). Also, to eliminate the possibility off being a part of another nearby-BoD, we probabilistically validate the chance of false accusation (detailed in Algorithm 3).

Now that f is determined to be the core domain c, the traffic classifier 55 labels f and its neighboring flows whose fingerprints match Bc as 1. As a result of this per-flow, per-client traffic classification, the traffic classifier 55 outputs a labeled list of flows F such that $F=\{(f_1, l_1), \ldots, (f_n, l_n)\}$.

In one specific example, the traffic classifier 55 uses an algorithm, shown below as Algorithm 1, to classify each represented flow f. The traffic classifier 55 receives the core domains C, the BoDs, and a set of flows F generated by a client. The traffic classifier 55 then outputs flow information where the flows are annotated with the core domain with which they are associated, or an indication of "unknown" in case no association with a core domain is identified.

---

Algorithm 1 classify(C,BoDs,F)

---

Input:
    $C = \{c_1,\ldots,c_k\}$     ▷ core domains
    $BoDs = \{B_{c_1},\ldots,B_{c_k}\}$     ▷ BoDs of core domains in C
    $F = \{f_1,\ldots,f_n\}$     ▷ list of flows of a client to be classified
Output:
    $O = \{(f_1,l_1),\ldots,(f_n,l_n)\}$     ▷ labeled flows
Parameters:
    $\Delta T_{EV}$     ▷ timeout without flows to expert BoDs
1:  W ← ∅     ▷ set of currently active EVs
2:  O ← ∅
3:  for f ∈ F do
4:     // retrieve start/end times and domain name of f
5:     $ts_f, te_f, d_f$ ← parse(f)     ▷ $ts_f$ is also current time
6:     // remove expired EVs
7:     $W \leftarrow \{(ts,te,c_i,B_{c_i}) \in W | ts_f - te \leq \Delta T_{EV}\}$
8:     // obtain the best neighbor BoD among the active ones
9:     $w_{best} \leftarrow \{(ts,te,d_f,B)\}$ ← Best BoD$(ts_f,d_f,W)$
10:     $c = d_f$     ▷ $d_f$ is the core domain of the best windows
11:     if c ∈ C ∧ valid_core(c,$ts_f$,$w_{best}$,F) then
12:     // start an evaluation window for core domain c
13:     W ← W + $\{(ts_f,te_f,c,B_c)\}$
14:     O ← O + $\{(f,c)\}$
15:     else
16:     if $w_{best} \neq ∅$ then
17:         O ← O + $\{(f,c)\}$
18:         // enlarge time boundary of best EV
19:         te($w_{best}$) ← max($te_f$,te($w_{best}$))
20:     else
21:         O ← O + {(f,"unknown")}

---

Algorithm 1, above, is based on the concept of an evaluation window (EV), i.e., the time window during which a support flow can appear before or after the observation of a core domain. For this, Algorithm 1 maintains a list of active EVs, denoted as W. The list grows as new core domains are observed (lines 11-14), and entries are aged out based on a timeout $\Delta T_{EV}$, i.e., window ending time te=$\max_{f \in W}$ tef is elapsed by at least $\Delta T_{EV}$ (line 7).

Different from the training phase, the evaluation window duration is extended during classification. This happens when new support domains are found (lines 18-19). The rationale is that flows to support domains may be observed a significant time after the core domain when, for example, the endpoint/client continues to download objects due to a user action (e.g., scrolling a webpage that triggers the download of new elements), or to the application fetching further blocks of data (e.g., a video player using adaptive streaming and downloading new portions of the video).

In circumstances in which multiple active windows are alive, the traffic classifier 55 uses the function BestBoD( ) (line 9) to determine which BoD is the most likely one associated with the flow, as shown below in Algorithm 2. In one specific example, the traffic classifier 55 uses a "closest in time" criteria. That is, the traffic classifier 55 identifies the closest active window among W, and for which the domain df of f has a frequency above the MinFreq threshold (lines 2-5).

---

Algorithm 2 BestBoD($ts_f,d_f,W$)

---

Input:
    $ts_f,d_f$     ▷ start time and domain of flow to classify
    W = {(ts,e,c,B)}     ▷ set of active BoDs
Output:
    $O = (ts_o,te_o,c_o,B_o)$     ▷ best BoD
Parameters:
    MinFreq     ▷ Minimum tf score for valid support domains
1:  $w_{card} \leftarrow ∅$; Min=∞
2:  for all $\{w_i = (ts,te,c,B) \in W | tf(d_f,B) > MinFreq\}$ do
3:     if $((ts_f - ts) \leq Min)$ then
4:         Min ← $(ts_f - ts)$
5:         $w_{card} \leftarrow w_i$
6:     O ← $w_{cand}$     ▷ take most recent EV

---

As noted above, a challenging problem is to resolve the ambiguity for a domain that may be both a support domain and a core domain (e.g., as in FIG. 1C). To disambiguate, the traffic classifier 55 relies on the scores S(d, B), as shown below in Algorithm 3.

---

Algorithm 3 valid_core($d_f,ts_f,w_{best},F$)

---

Input:
    $d_f,ts_f$     ▷ candidate core domain and current time
    $w_{best} = (ts,te,c,B)$     ▷ the best BoD
    $F = \{f_1,\ldots,f_n\}$     ▷ list of flows of a client to be classified
Output:
    Valid     ▷ TRUE if the domain is a valid core
Parameters:
    $\Delta T_{EV}$     ▷ timeout without flows to expire BoDs
    MinFreq     ▷ Minimum tf score for valid support domains
1:  // Possible core: compute score against $B_{df}$ for future flows
2:  for all $\{f_i | ts_f \leq ts_{fi} \leq ts_f + \Delta T_{EV}\}$ do
3:     if $(tf(d(f_i),B_{df}) > MinFreq)$ then
4:         core ← core + $S(d(f_i),B_{df})$
5:  // Possible support: compute the score against $w_{best}$
6:  for all $\{f_i | ts \leq ts_{fi} \leq ts_f + \Delta T_{EV}\}$ do
7:     if $(tf(d(f_i),B) > MinFreq)$ then
8:         support ← support + $S(d(f_i),B)$
6:  if (core > support) then
10:     Valid ← TRUE
11:  else
12:     Valid ← FALSE

---

In particular, the traffic classifier 55 first considers $d_f$ as a possible core domain and computes a "core score" as the sum of S(d, B) for those flows in the EV after the current flow time $t_{sf}$. As before, only terms above the MinFreq threshold are considered (lines 2-4). Next, the traffic classifier 55 considers $d_f$ as a possible support domain for the best candidate core (wbest) and computes the support score as the sum of S(d, B) for flows against $w_{best}$ (lines 6-8). The traffic classifier 55 considers both those past and future flows. The rationale is that EV would be extended in case f becomes a support domain flow. At last, the traffic classifier compares core and support to classify f (lines 9-12).

As shown in FIG. 3, the traffic classifier 55 generates network traffic management records 75 for use in management of the underlying network. In circumstances in which a network flow is associated with a core domain, a network traffic management record 75 may provide an indication of the core domain flow and the associated support domain flows. In circumstances in which a network flow is not associated with a core domain (i.e., is a non-relevant flow) the network traffic management record 75 may indicate that no core domain association was found (i.e., that the flow is non-relevant).

In summary of FIG. 3, illustrates a technique to identify a primary service that a user intends to access and techniques to associate traffic with that primary service. As noted, the techniques presented herein deploy a bag of domain (BoD), which is a list of support domains determined to be associated with a core domain, as a model of the traffic (network flow) activity resulting from accessing a web service (e.g., cloud service, website, mobile application, etc.). The self-learning method is deployed to select detected domains that belong to a bag of domain, as well as the domain to which the bag of domains belongs. That is, the techniques classify newly observed flows to a bag of domain among a set of stored bag of domains representing the network activity related different web services.

Figure 4A:
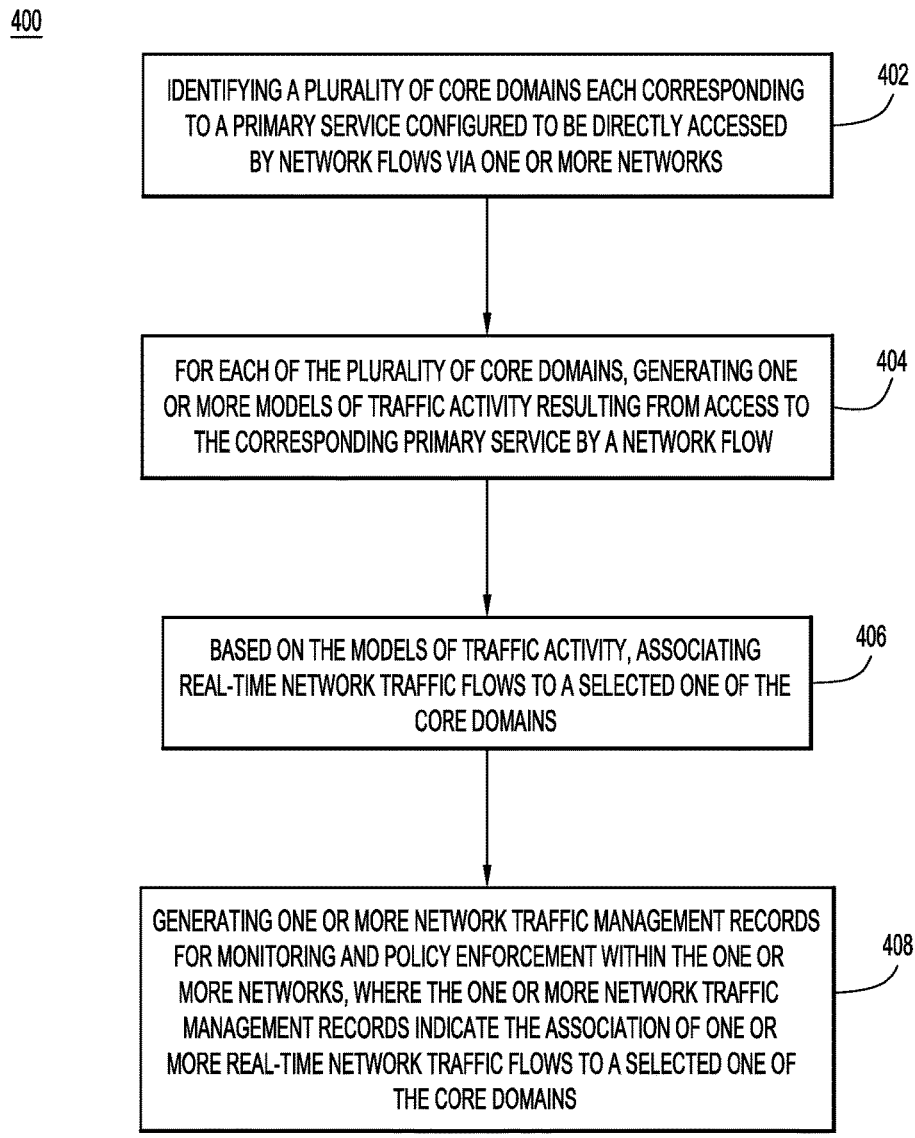
FIGS. 4A and 4B are generalized flowcharts for monitoring network traffic, according to example embodiments.

FIG. 4A illustrates a high-level flow chart of a process 400 that generalizes the concepts described above in connection with FIGS. 1-3. Reference is also made to FIG. 1 for purposes of this description. Process 400 begins at 402 where the intention inference and traffic association system 40 identifies a plurality of core domains each corresponding to a primary service configured to be directly accessed by network flows via one or more networks. At 404, the intention inference and traffic association system 40 generates, for each of the plurality of core domains, one or more models of traffic activity resulting from access to the corresponding primary service by a network flow. At 406, the intention inference and traffic association system 40 associates, based on the models of traffic activity, real-time network traffic flows to a selected one of the core domains. At 408, the intention inference and traffic association system 40 generates one or more network traffic management records for monitoring and policy enforcement within the one or more networks, where the one or more network traffic management records indicate the association of one or more real-time network traffic flows to a selected one of the core domains.

Figure 4B:
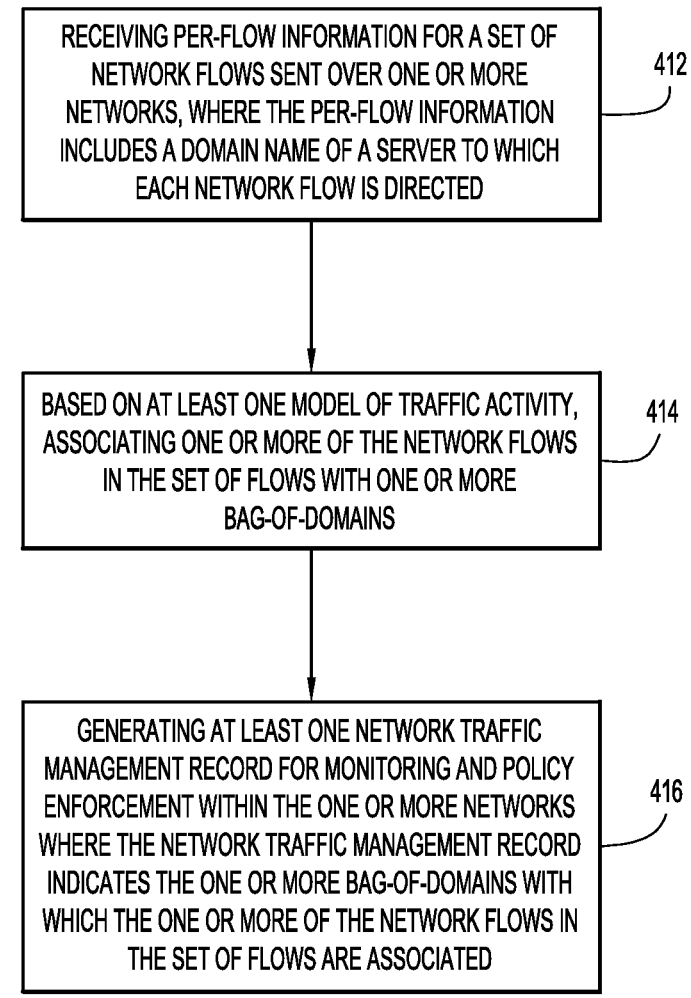

FIG. 4B illustrates another high-level flow chart of a process 410 that generalizes the concepts described above in connection with FIGS. 1-3. Reference is also made to FIG. 1 for purposes of this description. Process 410 begins at 412 where the intention inference and traffic association system 40 receives per-flow information for a set of network flows sent over one or more networks, where the per-flow information includes a domain name of a server to which each network flow is directed. At 414, the intention inference and traffic association system 40 associates, based on at least one model of traffic activity, one or more of the network flows in the set of flows with one or more bag-of-domains. At 416, the intention inference and traffic association system 40 generates at least one network traffic management record for monitoring and policy enforcement within the one or more networks where the network traffic management record indicates the one or more bag-of-domains with which the one or more of the network flows in the set of flows are associated.

Figure 5:
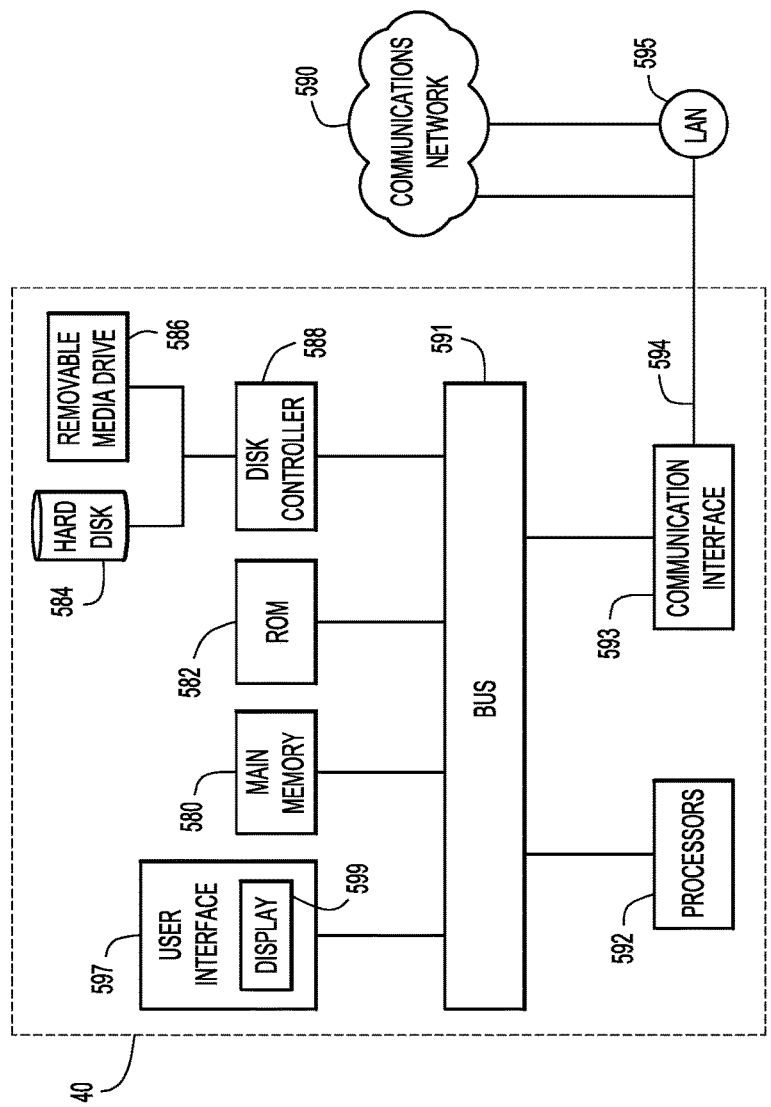
FIG. 5 is a block diagram illustrating an example hardware configuration for an intention inference and traffic association system on which operations described herein may be executed, according to an example embodiment.

FIG. 5 is a block diagram illustrating an arrangement for an intention inference and traffic association system 40 upon which the embodiments presented may be implemented. The intention inference and traffic association system 40 includes a bus 591 or other communication mechanism for communicating information, and one or more processors 592 coupled with the bus 591 for processing the information. While FIG. 5 shows a single processor block 592, it should be understood that the processors 592 may represent a plurality of processing cores, each of which can perform separate processing operations. The intention inference and traffic association system 40 also includes a main memory 580, such as a random access memory (RAM) or other dynamic storage device (e.g., dynamic RAM (DRAM), static RAM (SRAM), and synchronous DRAM (SD RAM)), coupled to the bus 591 for storing information and instructions to be executed by the one or more processors 592. In addition, the main memory 580 may be used for storing temporary variables or other intermediate information during the execution of instructions by the one or more processors 592.

The intention inference and traffic association system 40 includes a read only memory (ROM) 582 or other static storage device (e.g., programmable ROM (PROM), erasable PROM (EPROM), and electrically erasable PROM (EEPROM)) coupled to the bus 591 for storing static information and instructions for the one or more processors 592. Furthermore, the intention inference and traffic association system 40 also includes a disk controller 588 coupled to the bus 591 to control one or more storage devices for storing information and instructions, such as a magnetic hard disk 584, and a removable media drive 586. The storage devices may be added to the cloud management proxy device 130(1) using an appropriate device interface (e.g., Universal Serial Bus (USB), small computer system interface (SCSI), integrated device electronics (IDE), enhanced-IDE (E-IDE), direct memory access (DMA), or ultra-DMA, etc.).

The intention inference and traffic association system 40 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The intention inference and traffic association system 40 performs a portion or all of the processing steps of the process in response to the one or more processors 592 executing one or more sequences of one or more instructions contained in a memory, such as the main memory 580. Such instructions may be read into the main memory 580 from another computer readable medium, such as a hard disk 584 or a removable media drive 586. One or more processors in a multi-processing arrangement may also be employed to execute the sequences of instructions contained in main memory 580. In alternative embodiments, hard-wired circuitry may be used in place of or in combination with software instructions. Thus, embodiments are not limited to any specific combination of hardware circuitry and software.

As stated above, the intention inference and traffic association system 40) includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the intention inference and traffic association system 40, for driving a device or devices for implementing the process, and for enabling the intention inference and traffic association techniques (i.e., operations associated with core domains discoverer 45, BoD learner 50, and traffic classifier 55). Such computer readable storage media further includes a computer program product for performing all or a portion (if processing is distributed) of the processing presented herein. The computer program product may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The intention inference and traffic association system 40 also includes a communication interface 593 coupled to the bus 591. The communication interface 593 provides a two-way data communication coupling to a network link 594 that is connected to, for example, a local area network (LAN) 595, or to another communications network 590 such as the Internet. For example, the communication interface 593 may be a wired or wireless network interface card to attach to any packet switched (wired or wireless) LAN. As another example, the communication interface 593 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 593 sends and receives electrical, electromagnetic or optical signals that carry digital data streams representing various types of information.

In one form, the intention inference and traffic association system 40 includes a user interface 597 that includes a display 599 on which network traffic management records (i.e., indications of core domain flows and the associated support domain flows) may be provided to a user. However, it is to be appreciated that, in alternative embodiments, the network traffic management records may be exported to another device for display and/or subsequent analysis. The network traffic management records are used for network management (e.g., improvement and planning), as described in greater detail above.

Traditional solutions for traffic classification and metering do not provide visibility in the specific activities users are conducting, applications they are deploying, web and cloud services they are accessing, etc. As such, service providers and corporate network administrators alike face the challenge of not being able to properly dimension their network, charge users and policy traffic based on specific types of applications deployed and activities performed. The techniques presented herein are capable of grouping together network flows (e.g., HTTPs flows) belonging to the same transaction and identifying the domain name representative of the primary service being accessed (i.e., identify the core domain). The core domain may be instrumental in identifying the specific service or application, i.e., the user intent. The techniques presented herein also generate models of the traffic generated by accessing core domains based on the unordered set of all possible support domains that may be triggered by the core domain visit. Network flows observed in real-time can then be classified as core or support domains and, in the same of support domains, associate with a core domain.

In one form, the techniques presented herein provide a computer-implemented method comprising identifying a plurality of core domains each corresponding to a primary service configured to be directly accessed by network flows via one or more networks. The method further comprises, for each of the plurality of core domains, generating one or more models of traffic activity resulting from access to the corresponding primary service by a network flow. The method also comprises, based on the one or more models of traffic activity, associating real-time network traffic flows to a selected one of the core domains, and generating one or more network traffic management records for monitoring and policy enforcement within the one or more networks, where the one or more network traffic management records indicate the association of one or more real-time network traffic flows to a selected one of the core domains.

In one form, the techniques presented herein provide a computer-implemented method comprising receiving per-flow information for a set of network flows sent over one or more networks, where the per-flow information includes a domain name of a server to which each network flow is directed. The method further comprises, based on at least one model of traffic activity, associating one or more of the network flows in the set of flows with one or more bag-of-domains and generating at least one network traffic management record for monitoring and policy enforcement within the one or more networks, wherein the network traffic management record indicates the one or more bag-of-domains with which the one or more of the network flows in the set of flows are associated.

In another form, an apparatus is provided. The apparatus comprises one or more network interface units, a memory, and a processor. The processor is configured to identify a plurality of core domains each corresponding to a primary service configured to be directly accessed by network flows via one or more networks, for each of the plurality of core domains, generate one or more models of traffic activity resulting from access to the corresponding primary service by a network flow, based on the one or more models of traffic activity, associate real-time network traffic flows to a selected one of the core domains, and generate one or more network traffic management records for monitoring and policy enforcement within the one or more networks, where the one or more network traffic management records indicate the association of one or more real-time network traffic flows to a selected one of the core domains.

In another form, one or more non-transitory computer readable storage media encoded with instructions are provided. The instructions, when executed by a processor, cause the processor to: identify a plurality of core domains each corresponding to a primary service configured to be directly accessed by network flows via one or more network; for each of the plurality of core domains, generate one or more models of traffic activity resulting from access to the corresponding primary service by a network flow; based on the one or more models of traffic activity, associate real-time network traffic flows to a selected one of the core domains; and generate one or more network traffic management records for monitoring and policy enforcement within the one or more networks, where the one or more network traffic management records indicate the association of one or more real-time network traffic flows to a selected one of the core domains.

In another form, one or more non-transitory computer readable storage media encoded with instructions are provided. The instructions, when executed by a processor, cause the processor to: receive per-flow information for a set of network flows sent over one or more networks, where the per-flow information includes a domain name of a server to which each network flow is directed; based on at least one model of traffic activity, associate one or more of the network flows in the set of flows with one or more bag-of-domains; and generate at least one network traffic management record for monitoring and policy enforcement within the one or more networks where the network traffic management record indicates the one or more bag-of-domains with which the one or more of the network flows in the set of flows are associated.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   identifying a plurality of core domains, each core domain of the plurality of core domains corresponding to a primary service provided by a given server configured to be directly accessed by network flows via one or more networks;
   for each core domain of the plurality of core domains, generating one or more models of traffic activity resulting from access to the corresponding primary service by a network flow, wherein generating the one or more models comprises identifying at least one support domain flow triggered by the access to the corresponding primary service by the network flow;
   based on the one or more models of traffic activity, associating real-time network traffic flows to a selected one of the core domains;
   generating one or more network traffic management records for monitoring and policy enforcement within the one or more networks, wherein the one or more network traffic management records indicate the association of one or more real-time network traffic flows to the selected one of the core domains; and
   based on the one or more network management traffic records, blocking at least one of the one or more real-time network traffic flows.

2. The method of claim 1, further comprising:
   receiving real-time per-flow information for a set of network flows sent by an endpoint;
   identifying, from the per-flow information, at least one network flow as a core domain flow to a first primary service accessed by the set of network flows;
   based on the one or more models of traffic activity, identifying one or more support domain flows triggered by the core domain flow to the first primary service;
   wherein generating one or more network traffic management records comprises generating at least one network traffic management record that indicates the core domain flow and the one or more support domain flows triggered by the core domain flow to the first primary service.

3. The method of claim 1, wherein identifying comprises:
   generating a decision tree for classification of a domain associated with a network flow as a core domain corresponding to a primary service or as a support domain corresponding to an ancillary service evoked by the primary service.

4. The method of claim 3, wherein generating the decision tree comprises:
   obtaining a preselected list of core and support domains;
   extracting features from each of the core and support domains;
   determining, from the extracted features, feature differences differentiating core domains from support domains; and
   populating the decision tree based on the determined feature differences.

5. The method of claim 1, wherein generating the one or more models of traffic activity resulting from access to a primary service by a network flow for each of the plurality of core domains includes generating at least one model of traffic activity for a first core domain comprising:
   detecting a plurality of temporally-spaced network flows each directed to the first core domain;
   extracting all domains found within a preselected time window around each of the temporally-spaced network flows directed to the first core domain;
   scoring the domains found within each of the preselected time windows; and
   determining, based on the scoring of the domains found within each of the preselected time windows, which of the domains found within each of the preselected time windows is a support domain for the first core domain.

6. The method of claim 1, wherein the primary service is at least one of a web service or a cloud service.

7. The method of claim 1, wherein identifying a plurality of core domains comprises:
   building a list of core and support domains through observation of traffic in the network.

8. The method of claim 1, wherein identifying a plurality of core domains comprises:
   obtaining a preselected list of core and support domains.

9. A method comprising:
   receiving per-flow information for a set of network flows sent over one or more networks, where the per-flow information includes a domain name of a server to which each network flow is directed;
   based on at least one model of traffic activity, associating one or more of the network flows in the set of flows with one or more bag-of-domains, wherein the one or more network flows comprise a core domain flow to a primary service and one or more support domain flows to one or more ancillary services triggered by access to the primary service;
   generating at least one network traffic management record for monitoring and policy enforcement within the one or more networks, wherein the network traffic management record indicates the one or more bag-of-domains with which the one or more of the network flows in the set of flows are associated; and
   based on the at least one network management traffic record, blocking at least one of the one or more network traffic flows.

10. The method of claim 9, wherein associating one or more of the network flows in the set of flows with one or more bag-of-domains comprises:
    associating the one or more of the network flows in the set of flows to a plurality of bag-of-domains; and
    scoring the relative association of the one or more of the network flows to each of the plurality of bag-of-domains; and
    based on the scoring, probabilistically determining a specific domain to which the one or more of the network flows should be associated.

11. The method of claim 9, further comprising:
    generating a classification algorithm for classification of a domain associated with a network flow as a core domain corresponding to a primary service or as a support domain corresponding to a ancillary service evoked by the primary service.

12. The method of claim 9, wherein associating one or more of the network flows in the set of flows with one or more bag-of-domains comprises:
  identifying, from the per-flow information, at least one network flow from the set of flows as the core domain flow to the primary service accessed by the set of network flows;
  identifying, from the per-flow information, one or more of the network flows in the set of network flows as the one or more support domain flows to the one or more ancillary services triggered by the access to the primary service; and
  grouping the one or more support domain flows to the core domain flow as part of a same bag-of-domains.

13. The method of claim 12, further comprising:
  for at least the core domain for the primary service accessed by the set of network flows, generating a model of the network flow activity resulting from accessing the primary service.

14. The method of claim 13, wherein identifying one or more of the network flows in the set of flows as the one or more support domain flows to the one or more ancillary services triggered by the access to the primary service comprises:
  analyzing the network flows in the set of flows relative to the model of the traffic activity resulting from accessing the primary service.

15. The method of claim 13, wherein generating the model of the network flow activity resulting from accessing the primary service comprises:
  detecting a plurality of temporally-spaced network flows each directed to the core domain;
  extracting all domains found within a preselected time window around each of the temporally-spaced network flows directed to the core domain;
  scoring the domains found within each of the preselected time windows; and
  determining, based on the scoring of the domains found within each of the preselected time windows, which of the domains found within each of the preselected time windows is a support domain for the core domain.

16. The method of claim 9, wherein generating at least one network traffic management record comprises:
  providing, at a display screen, a list of bag-of-domains with which the one or more of the network flows in the set of flows can be associated.

17. An apparatus, comprising:
  one or more network interface units;
  a memory; and
  a processor configured to:
    identify a plurality of core domains, each core domain corresponding to a primary service configured to be directly accessed by network flows via one or more networks,
    for each core domain of the plurality of core domains, generate one or more models of traffic activity resulting from access to the corresponding primary service by a network flow, wherein for at least one of the plurality of core domains, to generate the one or more models of traffic activity the processor is configured to identify at least one support domain flow triggered by the access to the corresponding primary service by the network flow,
    based on the one or more models of traffic activity, associate real-time network traffic flows to a selected one of the core domains,
    generate one or more network traffic management records for monitoring and policy enforcement within the one or more networks, wherein the one or more network traffic management records indicate the association of one or more real-time network traffic flows to a selected one of the core domains; and
    based on the one or more network management traffic records, block at least one of the one or more real-time network traffic flows.

18. The apparatus of claim 17, wherein the processor is configured to:
  receive real-time per-flow information for a set of network flows sent by an endpoint;
  identify, from the per-flow information, at least one network flow as a core domain flow to a first primary service accessed by the set of network flows;
  based on the one or more models of traffic activity, identify one or more support domain flows triggered by the core domain flow to the first primary service;
  wherein to generate the one or more network traffic management records, the processor is configured to generate at least one network traffic management record that indicates the core domain flow and the one or more support domain flows triggered by the core domain flow to the first primary service.

19. The apparatus of claim 17, wherein to identify the plurality of core domains, the processor is configured to:
  generate a decision tree for classification of a domain associated with a network flow as a core domain corresponding to a primary service or as a support domain corresponding to an ancillary service evoked by the primary service.

20. The apparatus of claim 17, wherein to generate the one or more models of traffic activity, the processor is configured to:
  detect a plurality of temporally-spaced network flows each directed to the first core domain;
  extract all domains found within a preselected time window around each of the temporally-spaced network flows directed to the first core domain;
  score the domains found within each of the preselected time windows; and
  determine, based on the scoring of the domains found within each of the preselected time windows, which of the domains found within each of the preselected time windows is a support domain for the first core domain.

* * * * *